May 2, 1950 R. S. MAUTNER 2,505,980

VARIABLE RESISTANCE CAPACITY ARRANGEMENT

Filed Nov. 28, 1945 2 Sheets-Sheet 1

INVENTOR
Robert S. Mautner
BY
H. S. Grover
ATTORNEY

VARIABLE RESISTANCE CAPACITY ARRANGEMENT

Filed Nov. 28, 1945 2 Sheets-Sheet 2

INVENTOR
Robert S. Mautner
BY
H. S. Grover
ATTORNEY

Patented May 2, 1950

2,505,980

UNITED STATES PATENT OFFICE 2,505,980

VARIABLE RESISTANCE CAPACITY ARRANGEMENT

Robert S. Mautner, New York, N. Y., assignor to Radio Corporation of America, a corporation of Delaware Application November 28, 1945, Serial No. 631,438

6 Claims. (Cl. 178—44)

Figure 1:
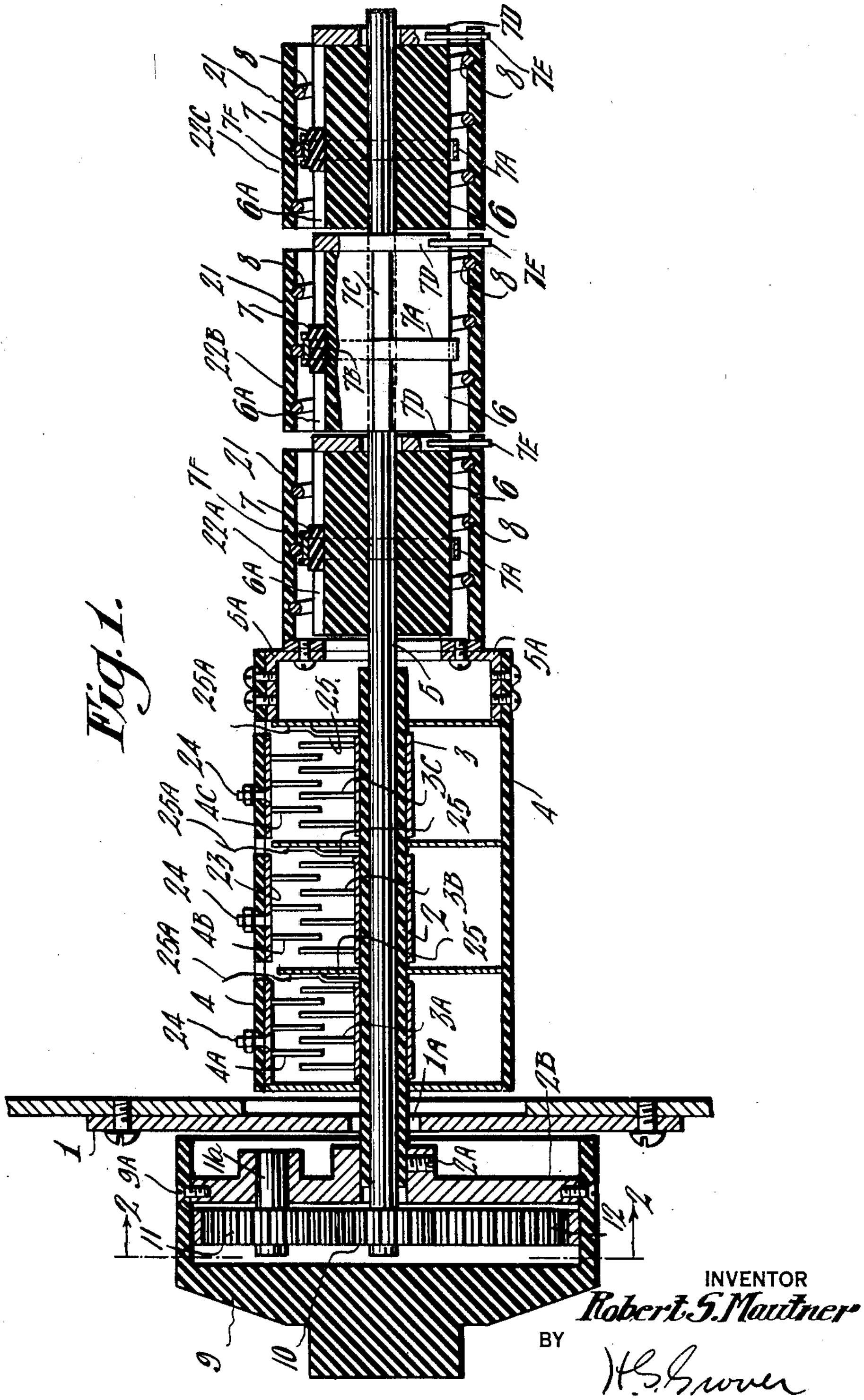

This invention relates to a new and useful variable resistance capacitance arrangement which may be applied to an oscillator circuit.

An object of this invention is to provide an improved variable resistance capacity arrangement wherein the frequenvy of an oscillator can be continuously varied from approximately 100 to 10,000 cycles, or greater, without changing circuits or circuit connections and without switching into and out of circuit numerous fixed resistors. According to my invention, this is accomplished by using a plurality of variable condenser units having a similar number of helically wound variable resistors. The resistors are ganged together with the condensers so as to be continuously variable.

My invention is especially useful in connection with resistance capacity oscillators wherein frequency is varied by simultaneously changing the capacity of a plurality of ganged condensers. As the condensers are normally varied from minimum to maximum over a 10 to 1 change, the frequency will, therefore, vary over a 10 to 1 range.

The frequency of such an oscillator depends primarily upon the values of a resistance and capacitance in series and parallel circuit combination.

The present prior art resistance capacity oscillators have variable capacitive units and fixed resistance units. In the prior art devices, the frequency is generally varied from a first range of 20 to 200 cycles per second. Then a switch is thrown to cover a second range from 200 to 2,000 cycles per second, a third range from 2,000 to 10,000 cycles, and a fourth range from 10,000 to 20,000 cycles. The disadvantage of having to stop and throw a switch, then return the dial back to the lower end of the scale each time a change in frequency range is desired, is one reason why a beat frequency oscillator covering a range from 20 to 16,000 cycles per second is frequently employed since it will provide a smooth gradual change of frequency without any abrupt transition when a change of frequency is required. A beat frequency oscillator, however, is expensive to manufacture and, furthermore, has a disadvantage in that the frequency tends to drift from a set frequency. By my invention, a smooth gradual change of constant frequency can be obtained without the need of throwing switches and returning the dial back to the lower end of the scale. This is accomplished by using helical wound resistance units which are associated with a mechanism for permitting several rotations of the variable resistance shafts to one-half a revolution of the condenser shaft. By this arrangement, it is feasible to obtain a 100 to 1 ratio or better in frequency coverage. Such a resistance capacity oscillator may, for example, cover from 100 to 10,000 cycles or more in one dial variation without a break or interruption in the dial shaft rotation.

Figure 2:
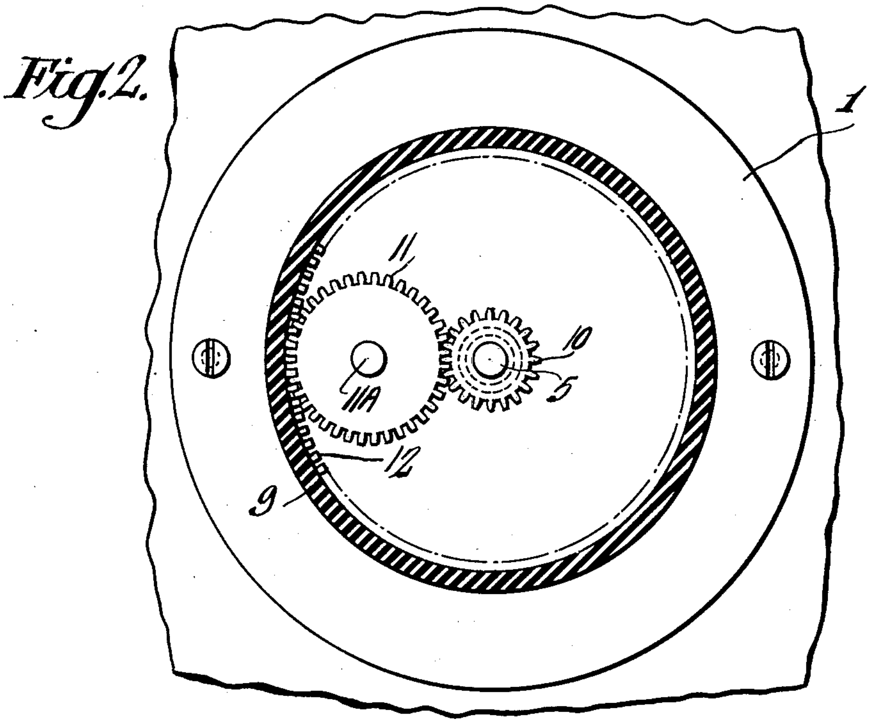
Figure 3:
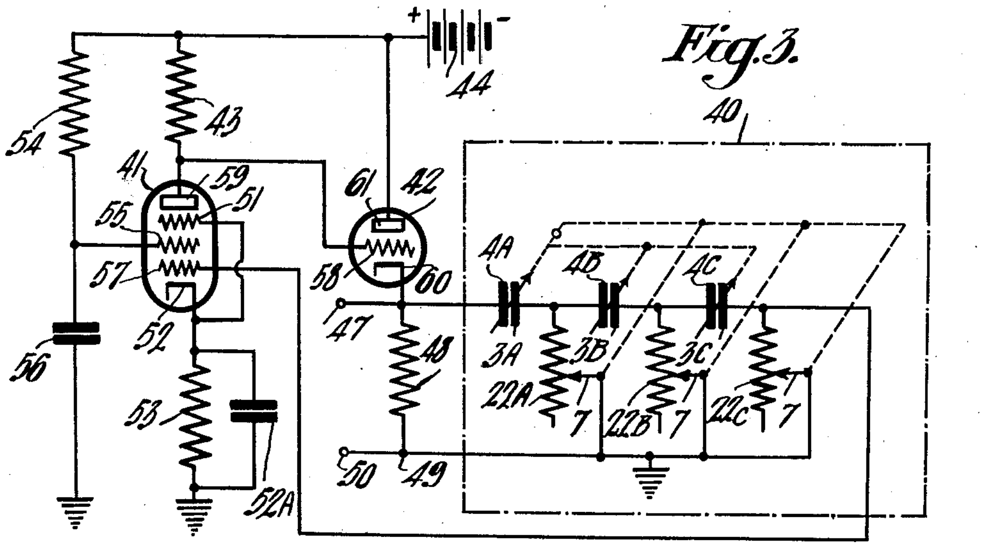

This invention will be more specifically described with the aid of the accompanying drawing wherein:

Fig. 1 is a plan view of the combined condenser and resistance arrangement of my invention, Fig. 2 is a front elevation partly in section which is taken on line 2—2 of Fig. 1, and Fig. 3 is a circuit diagram of a resistance capacity oscillator employing the arrangement shown in Figs. 1 and 2.

Referring now in detail to Figs. 1 and 2 of the drawing, a mounting disc 1 has located thereon an aperture 1A for the passage of a dial shaft 2 which is of insulation material and of hollow construction. The shaft 2 carries three groups of condenser plates, 3A, 3B and 3C. Each group consists of a plurality of movable condenser plates which are arranged in spaced parallel relationship on a metallic tube 3 which is secured to shaft 2. Three groups of fixed condenser plates 4A, 4B and 4C are arranged on insulation strips 4, to mesh with each group of the variable plates. The fixed plates are connected together by a metallic member 23. A connection 24 is made from each group of fixed plates. A spring strip 25 is provided to make connection from each group of rotor plates which connects member 3 to a terminal strip 25A.

Located concentrically within shaft 2 is a long metal shaft 5 having located thereon three groups of insulating drums 6 each having means for making contact with helically wound resistance units 22A, 22B and 22C which units are secured to the rear condenser unit 3C by a pair of support strips 5A arranged on the rear of strips 4. Each resistance unit is located within an insulating housing 21. The resistance units are electrically insulated from shaft 5 by the drum 6 having a longitudinal slot 6A. The resistance units are mechanically coupled together by shaft 5 which carries drum 6. Each resistance unit has a sliding and movable contact arm 7 of insulating material. A C-shaped spring contact 7A has a bent contact portion which is arranged to ride in a slot 7B on the arm 7 so as to be in movable contact with the inside portion of a helically wound resistance wire 8. The insulating contact arm 7 rides in slot 6A of drum 6. The upper portion of arm 7 has located thereon side guide members 7F for engaging both sides of the helical resistance wire 8 which causes the arm to move upon rotation of shaft 5. A longitudinal connection strip 7C furnishes a sliding contact with spring 7A. A collector ring 7D is secured to the end of drum 6 and is connected to strap 7C. A brush 7E makes contact with ring 7D. The terminal connection is made from each resistance unit to brush 7E. The variable condenser shaft 2 is fastened by a set screw 2A to a bearing disc 2B. The disc 2B is directly connected to a movable dial 9 by screws 9A located in the front of the panel. The shaft 5 is shown by Fig. 2 as being connected to a small pinion gear 10 located within the dial 9. The pinion gear 10 meshes with a planetary gear 11 having a shaft 11A which has a bearing in disc 2B. The latter gear is arranged to mesh with an internal gear 12 which is located within and secured to the outer portion of dial 9. The ratio of the gears is such as to rotate shaft 5 approximately twenty turns for one turn of the dial 9, or if desired ten turns rotation of shaft 5 for one-half turn of shaft 2.

With this arrangement, the frequency is varied by ganging the condenser groups 3 together for simultaneous rotation with the three groups of resistance units. The planetary gearing system provides a greater rate of change for the movable resistance contacts arms 7 than that of the rotor condenser shaft 2.

The frequency of this arrangement is given by the formula $$F=\frac{1}{2\pi\sqrt{6}RC}$$

when $R_1=R_2=R_3=R$ and $C_1=C_2=C_3=C$. The condensers can normally be varied from minimum to maximum over a 10 to 1 ratio change, and the resistors 10 to 1 or greater. The frequency of the oscillator can be varied without the necessity of throwing a switch and then returning the dial back to the lower end of the scale. The condenser plates are not semi-circular, but are of a special shape to give approximately a straight line frequency variation within a frequency range of 100 to 10,000 cycles per second. The capacity of each group of condensers is approximately 400 micromicrofarads. The resistance of each helical variable resistor is approximately 2 megohms.

The circuit diagram of a typical resistance capacitance oscillator which may employ the device of my invention is shown in Fig. 3. In addition to the capacitive and resistance elements shown within the block outline indicated by the broken line 40, electron tubes 41 and 42 are provided. The plate 59 of tube 41 has a resistance 43, one end of which is connected to the positive side of the plate supply 44. The plate 61 of tube 52 connects directly to positive plate potential 44. One of the output leads 47 connects to the cathode 60 of tube 42 having a resistance 48 which is connected to ground at 49, the other output terminal being connected to ground at 50. The suppressor grid 51 connects to cathode 52 which is bypassed to ground through a condenser 52A and resistance 53. A screen grid dropping resistance 54 connects from the screen grid 55 to the positive plate potential 44. A condenser 56 bypasses screen grid 55 to ground. The control grid 57 is connected to condenser 3C and resistance 22C. The control grid 58 connects to plate 59 of tube 41.

The improved frequency varying system of this invention may be used in circuits other than that of the resistance capacitance oscillator disclosed above.

What is claimed is:

1. A frequency varying system comprising a plurality of groups of spaced rotor and stator capacitance elements, an operating knob, a ring gear secured to and located within said knob, a disc located within and secured to said knob, a hollow shaft for mounting the rotor elements of each group, said hollow shaft arranged for rotation with said disc, an intermediate gear mounted for rotation on said disc and arranged to mesh with said ring gear, a plurality of spaced resistance elements each having a variable tap, a rotatable shaft concentrically arranged to rotate within and project beyond said hollow shaft, a pinion gear secured to that end of said rotatable shaft located within the knob, said pinion gear arranged to mesh with said intermediate gear each one of said variable taps being insulatingly secured to said rotatable shaft at the portion which projects beyond said hollow shaft, and means including said gears coupled together to rotate said hollow shaft at a different rate of change than said second mentioned shaft whereby each group of capacitance and resistance elements are varied together.

2. A frequency varying system comprising a plurality of groups of spaced rotor and stator capacitance elements, an operating knob, a ring gear secured to and located within said knob, a disc located within and secured to said knob, a hollow shaft of insulating material for mounting the rotor elements of each group, said hollow shaft arranged for rotation with said disc, an intermediate gear mounted for rotation on said disc and arranged to mesh with said ring gear, a plurality of spaced resistance elements each having a variable tap, a rotatable shaft concentrically arranged to rotate within and project beyond said hollow shaft of insulating material, a pinion gear secured to that end of said rotatable shaft located within the knob, said pinion gear arranged to mesh with said intermediate gear, each one of said variable taps being insulatingly secured to said rotatable shaft at the portion which projects beyond said hollow shaft, and means including said gears coupled together to rotate said hollow shaft at a slower rate of change than said second mentioned shaft, whereby all groups of capacitance and resistance elements are varied together.

3. A resistance capacitance device comprising a plurality of groups of spaced rotor and stator capacitance elements, a hollow operating knob, a train of gears including a ring gear secured to and located within said knob, a pinion gear and an intermediate gear, a disc located adjacent said ring gear and secured to said knob for rotation therewith, said intermediate gear mounted for rotation on said disc and arranged to mesh with said ring gear, a hollow shaft of insulating material arranged to support the rotor elements of each group of capacitive elements, said hollow shaft arranged for rotation with said disc, a plurality of spaced resistance elements each having a variable tap, a rotatable shaft concentrically arranged to rotate within and project beyond said hollow shaft, said pinion gear secured for rotation with said second mentioned shaft and arranged to mesh with said intermediate gear, each one of said variable taps being insulatingly secured to said rotatable shaft at the portion which projects beyond said hollow shaft, and means including said train of gears to rotate the hollow shaft at a different rate of change than that of said second mentioned shaft, whereby each group of capacitance and resistance elements are all varied together.

4. A variable resistance capacitance arrangement comprising three groups of spaced rotor and stator capacitance elements, a hollow operating knob, a system of gears including a ring gear secured to and located within said knob, a pinion gear and an intermediate gear, a disc located adjacent said ring gear and secured to said knob, said intermediate gear mounted for rotation on said disc and arranged to mesh with said ring gear a hollow shaft of insulating material, each group of rotor elements being mounted for rotation on said hollow shaft, said hollow shaft arranged for rotation with said disc, three groups of spaced resistance elements each having a variable tap, a rotatable shaft concentrically arranged to rotate within and project beyond said hollow shaft, each one of said variable taps being insulatingly secured to said rotatable shaft at the portion which projects beyond said hollow shaft, said pinion gear secured for rotation with said second mentioned shaft and arranged to mesh with said intermediate gear, and means including said rotatable knob and said system of gears located within said rotatable knob to rotate the hollow shaft at a different rate of change than that of said second mentioned shaft, whereby each group of capacitance and resistance elements are all varied together.

5. A frequency varying system comprising a plurality of groups of spaced rotor and stator capacitance elements, a hollow operating knob, a train of gears including a ring gear secured to and located within said knob, a pinion gear and an intermediate gear, a disc located adjacent said ring gear and secured to said knob, said intermediate gear mounted for rotation on said disc and arranged to mesh with said ring gear, a hollow rotatable shaft of insulating material, the rotor element of each group of capacitive elements being mounted for rotation upon said hollow shaft, said hollow shaft arranged for rotation with said disc, a plurality of helically wound spaced resistance elements each having a variable tap for making contact with the helically wound resistance, a rotatable shaft concentrically arranged to rotate within and project beyond said hollow shaft, said pinion gear secured for rotation with said second mentioned shaft and arranged to mesh with said intermediate gear, each one of said variable taps being insulatingly secured to said rotatable shaft at the portion which projects beyond said hollow shaft, and means including said train of gears to rotate the hollow shaft at a slower rate of change than said second mentioned shaft, whereby all groups of capacitance and resistance elements are varied together.

6. A frequency varying system comprising a plurality of groups of spaced rotor and stator capacitance elements, a hollow operating knob, a train of gears including a ring gear secured to and located within said knob, a pinion gear and an intermediate gear, a disc located adjacent said ring gear and secured to said knob, said intermediate gear mounted for rotation with said disc and arranged to mesh with said ring gear, a hollow rotatable shaft of insulating material, the rotor element of each group of capacitive elements being mounted for rotation upon said hollow shaft, said hollow shaft arranged for rotation with said disc, a plurality of helically wound spaced resistance elements each having a variable tap for making contact with the helically wound resistance, a rotatable shaft concentrically arranged to rotate within and project beyond said hollow shaft, said pinion gear secured for rotation with said second mentioned shaft and arranged to mesh with said intermediate gear, each one of said variable taps being insulatingly secured to said rotatable shaft at the portion which projects beyond said hollow shaft, and means including said train of gears to rotate the hollow shaft at a slower rate of change than said second mentioned shaft, whereby a one-half turn of the hollow shaft rotates approximately ten turns for the last mentioned shaft to vary the rate of change for the capacitance elements at a slower rate than the variation of the resistance elements.

ROBERT S. MAUTNER.

REFERENCES CITED

The following references are of record in the file of this patent:

UNITED STATES PATENTS

| Number | Name | Date |
|---|---|---|
| 1,466,293 | Brooks | Aug. 28, 1923 |
| 1,577,613 | Dunmore | Mar. 23, 1926 |
| 1,613,423 | Wegel | Jan. 4, 1927 |
| 1,622,783 | Heyman | Mar. 29, 1927 |
| 1,625,094 | Reppert | Apr. 19, 1927 |
| 2,072,240 | Zigler | Mar. 2, 1937 |
| 2,185,870 | Smith | Jan. 2, 1940 |
| 2,228,638 | Mercier | Jan. 14, 1941 |
| 2,236,985 | Bartelink | Apr. 1, 1941 |
| 2,371,159 | Erb | Mar. 13, 1945 |
| 2,398,112 | O'Brien | Apr. 9, 1946 |